United States Patent [19]
Lagnitre

[11] 3,941,493
[45] Mar. 2, 1976

[54] DEVICE FOR MOUNTING SPHERICAL PISTON-ROD ENDS OF BARREL-TYPE HYDRAULIC MACHINE

[75] Inventor: Alain Lagnitre, Annecy, France

[73] Assignee: Societe Nouvelle de Roulements, Annecy, France

[22] Filed: Oct. 9, 1974

[21] Appl. No.: 513,453

[30] Foreign Application Priority Data
Oct. 11, 1973 France .............................. 73.36349

[52] U.S. Cl. .................. 403/122; 403/326; 91/499
[51] Int. Cl.² ...................................... F16C 11/06
[58] Field of Search .................. 91/499, 507; 92/57; 403/315, 326, 56, 122; 85/8.8

[56] References Cited
UNITED STATES PATENTS

| | | | |
|---|---|---|---|
| 964,702 | 7/1910 | Sharpneck | 91/507 |
| 3,787,128 | 1/1974 | Maistrelli | 403/135 |

FOREIGN PATENTS OR APPLICATIONS

| | | | |
|---|---|---|---|
| 1,245,002 | 9/1960 | France | 85/8.8 |
| 275,904 | 9/1951 | Switzerland | 287/DIG. 7 |
| 747,133 | 3/1956 | United Kingdom | 85/8.8 |
| 339,455 | 12/1930 | United Kingdom | 85/8.8 |
| 801,353 | 1/1951 | Germany | 287/DIG. 7 |

*Primary Examiner*—Andrew V. Kundrat
*Attorney, Agent, or Firm*—Fleit & Jacobson

[57] ABSTRACT

This device for retaining the ball-shaped ends of piston-rods in the corresponding cavities of a swash or impeller plate of a rotary cylinder-barrel hydraulic machine. The device comprises a clip provided in turn with spaced radial stardisposed loops, each adapted to co-act with one portion of the surface of the relevant ball-shaped end, the upper or outer portion of each loop being retained by an axial abutment element rigid with said swash or impeller plate, the segment of said clip which interconnects the adjacent loops being adapted to co-act with a retaining member rigid with said swash or impeller plate.

3 Claims, 6 Drawing Figures

DEVICE FOR MOUNTING SPHERICAL PISTON-ROD ENDS OF BARREL-TYPE HYDRAULIC MACHINE

The present invention relates in general to means for retaining a swivelling ball-shaped member in a cavity and has specific reference to a device adapted to retain the ball-shaped ends of piston rods in corresponding spherical cavities of the swash or impeller plate of a hydraulic machine of the rotary cylinder barrel type.

More particularly, this invention provides a device for simultaneously fastening and retaining a plurality of such ball-shaped ends of piston rods in angularly spaced cavities formed in the impeller or swash plate of a hydraulic machine of the rotary cylinder-barrel type.

In machines of the above-mentioned type, as described notably in the U.S. Pat. No. 3,589,244, the frictional resistance encountered by the pistons in the relevant cylinder bores tends to separate the ball-shaped piston-rod ends from the corresponding cavities of the impeller or swash plate during the suction stroke. Now the efforts thus created may be relatively great when starting from cold pumps intended for operation at relatively high pressures, for in these pumps the clearance between pistons and cylinder bores in the cylinder barrel have a relatively low value in order to limit or reduce leakages.

Under these conditions, some means must be provided for retaining the ball-shaped ends of the piston rods, and these means must be capable of withstanding relatively considerable efforts while having enough flexibility to compensate the differences in coplanarity between the centres of said ball-shaped ends and the angular discrepancies between these ball-shaped ends, due to the necessary machining tolerances in the manufacture of said balls and cavities.

It is the primary object of the present invention to simultaneously retain the piston-rod spherical ends in their cavities by means of a device adapted to take up the angular and coplanarity discrepancies between the centres of said cavities, without exerting unduly high stress on this device, which is to construct simple and economical.

According to this invention, the retaining device for the ball-shaped ends of piston-rods of hydraulic cylinder-barrel machines is characterised in that it comprises angularly spaced star-disposed radial loops. The loops are interconnected to form a clip wherein each loop is adapted to engage one portion of the surface of a ball-shaped end. The upper or outer portion of each loop is retained by an axial abutment or shoulder formed integrally or solid with the swash or impeller plate and, the segments interconnecting said loops are adapted to coact with another retaining member rigidly connected to the swash or impeller plate.

A typical form of embodiment of this invention will now be described by way of example with reference to the attached drawing, in which.

Figure 1:
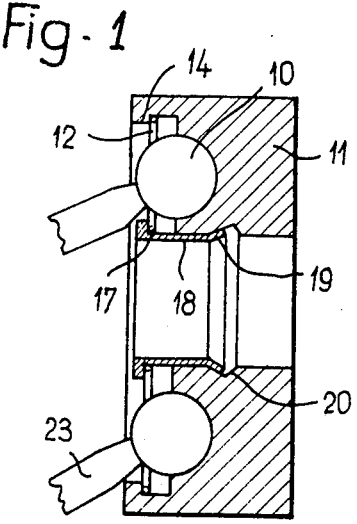
FIG. 1 is a fragmentary part-sectional view of a hydraulic pump to which the present invention is applicable.
Figure 2:
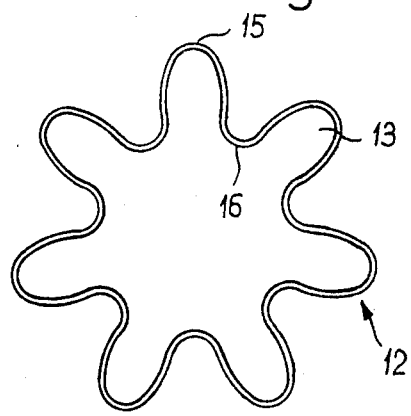
FIG. 2 is a separate view showing the clip as seen in front view, in its simplest form, and FIGS. 3 to 6 inclusive illustrate on a larger scale details of the clip positioned in operative relationship with respect to one of the ball-shaped ends of a piston-rod.

In FIG. 1, the ball-shaped ends 10 of the piston-rods are retained against the impeller or swash plate 11 of the hydraulic cylinder-barrel pump by means of a clip 12 constituting the essential object of this invention. In this example, the clip 12 has the general configuration shown in FIG. 2, and comprises a star-like arrangement of a plurality of loops 13 made of flexible metal wire, the number of loops in each clip 12 corresponding to the number of ball-shaped ends to which they are substantially centered.

The plate 11 comprises an axial abutment shoulder 14 adapted to retain the upper or outer portions 15 of the clip loops 13, i.e. the clip portions lying on the major diameter thereof and being adapted to be resiliently engaged behind this abutment shoulder 14.

Figure 4:
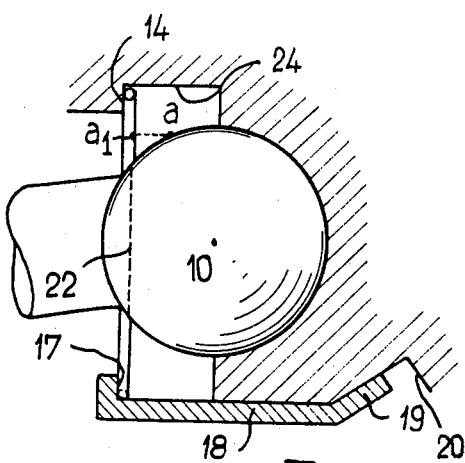

The clip segments 16 interconnecting the successive loops 13 of clip 12 are retained on a common minor diameter by another abutment shoulder 17 formed by an out-turned lip of a retaining member 18 fastened to the plate 11. This retaining member 18 is adapted to be screwed to a tapped central aperture of the plate 11 or, as shown in FIG. 1 or 4, secured by crimping its end 19 opposed to said out-turned lip or shoulder 17 in a groove 20 of said plate.

This crimping operation, if used, is carried out during the pump assembling operation.

Figure 3:
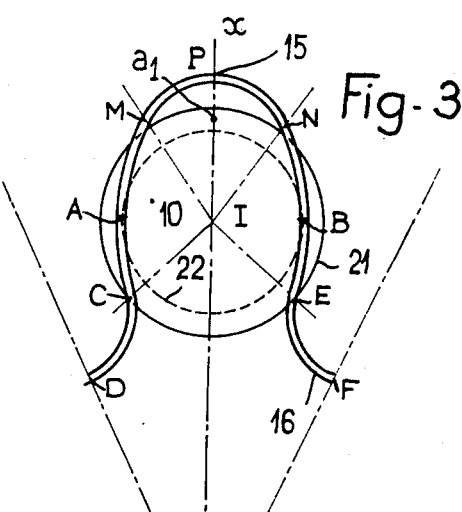

The shape or configuration of the loops 13 of clip 12 is not necessarily that illustrated. Thus, an ordinary arrangement is illustrated in FIGS. 3 and 4; the axis Ox is that containing both the projection O of the pump shaft axis onto plane of FIG. 3 (clip plane) and the projection 1 of the centre of a ball-shaped piston-rod end 10 also onto the plane of FIG. 3.

The circle 21 designates the outer diameter of ball-shaped end 10. It will be assumed that the clip 12 partially engages the ball-shaped end 10 at least at two points A and B disposed on a circle 22, in a plane parallel to the clip. It will also be assumed that the geometry of the parts is perfect, and that points A and B are symmetric in relation to the axis Ox. The points M, N, C, E, D and F are selected in FIG. 3 for the purpose of giving a particular but not compulsory definition of the geometric shape of each loop 13. From A to M, the radius of curvature of this loop is greater than that of the circle 22, and from M to P the radius of curvature of the loop is smaller than that of said circle 22. Thus, the loop between A and P (as well as between P and B, for obvious reasons of symmetry) does not contact the relevant ball-shaped end 10. Between A and C, the radius of curvature of the loop increases gradually to attain infinity at C. From C to D, the curvature is in the opposite direction. Thus, the loop from A to D (as well as between B and F for reasons of symmetry) does not contact the ball-shaped end 10. In fact, since the loop 13 is contained in a plane, all the points $a$ lying on said ball-shaped end and of which the projection $a_1$ onto the plane of FIG. 3 lies externally of the circle 22 will be located beneath the clip (FIG. 3) or to the right thereof (as seen in FIG. 4). When assembling the pump, the piston-rod ball-shaped ends 10 are presented in front of their relative cavities formed in the plate 11 and the piston rods 23 are slipped into the loops 13 of said clip 12.

By causing the elastic distortion of this clip 12 the loop ends 15 are introduced into the groove 24 of plate 11, behind the shoulder 14. Thus, the retaining ring member 18 can be inserted so that its shoulder or out-turned lip 17 engages the segments 16 interconnecting the loops, whereby the clip itself is forcibly caused to engage the ball-shaped end 10 at points A and B, and also the shoulder 14 of plate 11. Finally, the other end 19 of ring member 18 is crimped in position in said groove 20.

The chief advantage derived from this device lies in the fact that its inherent elasticity permits compensation of during the assembling operation the errors, whether in angular relationship or in depth, likely to arise in the position of said ball-shaped ends 10.

During this assembling operation, the relative angular shift between a given ball-shaped end 10 and the axis of symmetry of a loop will cause the contact to take place either at A or at B, according to the direction in which the shift exists.

Thus, assuming that during this assembling operation the contact is produced firstly at A. By depressing the ring 18, the loop segment AD will yield, thus enabling the ring 18 to move forwards, i.e. towards the plate 11. The other segment BF will then yield until the mutual engagement between the loop 13 and the ball-shaped end 10 takes place at B.

More generally, if during the assembling one loop of clip 12 engages the corresponding ball-shaped end 10 before the other loops, the flexion of arms such as DA and BF will permit the movement of ring 18 until all the other loops contact their corresponding ball-shaped ends 10. It is thus clear that the device of this invention permits of compensating automatically any coplanarity error in the centres of the various ball-shaped members 10.

Figure 5:
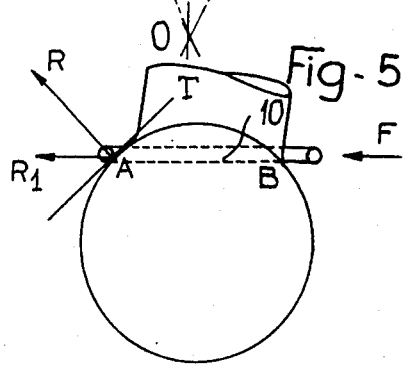

The angular shift of these spherical members 10 may thus be compensated by a corresponding angular shift of the clip loops. This will take place during the assembling operation, of course, when pushing the shoulder 17 against the segments 16 interconnecting the various clip loops with one another, due to the inclination of the plane (T) tangent to the point of contact A or B, according to the direction of the defect or shift, as will be seen in FIG. 5. The first contact occurring at A, the reaction R will have a horizontal component $R_1$ tending to recentre the clip on the ball-shaped member 10 in the direction of the arrow F.

Instead of the points of contact A and B between the clip 12 and ball-shaped member 10, a line of contact may be contemplated which imparts a radius of curvature equal to that of the above-defined circle 22 to the loop along a segment surrounding A and B. This line of contact will be assimilated in this case to a circular arc.

Figure 6:
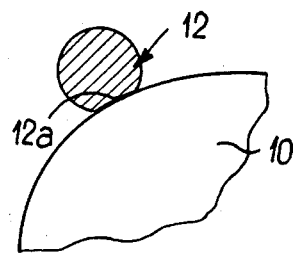

The contact between the ball-shaped members 10 and the clip may be further improved by forming a part-spherical surface 12a of the same radius as the ball-shaped member 10 in the clip wire, as illustrated diagrammatically in FIG. 6.

It would not constitute a departure from the basic principles of this invention to use an open or closed clip, and to make this clip from a sheet-metal blank, so as to form a clip having a square or rectangular cross-sectional contour, the clip also being adapted to be formed from wire sections with or without their ends connected end to end.

Although a specific form of embodiment of this invention has been described hereinabove and illustrated in the accompanying drawing, it will readily occur to those skilled in the art that various modifications and changes may be brought thereto without departing from the scope of the invention as set forth in the appended claims.

What is claimed as new is:

1. In a rotary cylinder-barrel hydraulic machine having a plate including cavities, piston rods with ball-shaped ends mounted in the cavities, an elastically deformable annular clip having an undulating peripheral configuration and having:

a plurality of arcuately spaced radial loops about said clip each comprising a central portion coacting with a respectively corresponding ball-shaped end to be retained by said clip, an outer portion coacting with axial abutment provided on the plate to retain said loop, and an inner portion interconnecting said loop to adjacent loops and coacting with a retaining member cooperating with the plate, each of said loops coacting with a respective ball-shaped end to retain each of those ends in the corresponding cavities while deforming to compensate for errors in the positioning of the ball-shaped ends.

2. Device as set forth in claim 1, wherein the loop section contacting said ball-shaped piston-rod end is of circular arc configuration.

3. Device as set forth in claim 1, wherein said clip has a contact surface shaped for partially accomodating the curvature of said ball-shaped piston-rod end.

* * * * *